United States Patent
McGinley

(10) Patent No.: US 10,377,458 B1
(45) Date of Patent: Aug. 13, 2019

(54) JOYSTICK SYSTEM FOR A WATERCRAFT

(71) Applicant: BRP US INC., Sturtevant, WI (US)

(72) Inventor: Samuel McGinley, Milwaukee, WI (US)

(73) Assignee: BRP US INC., Sturtevant, WI (US)

( * ) Notice: Subject to any disclaimer, the term of this patent is extended or adjusted under 35 U.S.C. 154(b) by 151 days.

(21) Appl. No.: 15/419,407

(22) Filed: Jan. 30, 2017

Related U.S. Application Data

(60) Provisional application No. 62/289,086, filed on Jan. 29, 2016.

(51) Int. Cl.
| | | |
|---|---|---|
| *B63H 21/21* | (2006.01) | |
| *B63H 20/12* | (2006.01) | |
| *B63H 25/02* | (2006.01) | |
| *G05D 1/02* | (2006.01) | |
| *B63H 20/00* | (2006.01) | |

(52) U.S. Cl.
CPC .......... *B63H 20/12* (2013.01); *B63H 21/213* (2013.01); *B63H 25/02* (2013.01); *G05D 1/0206* (2013.01); *B63H 2020/003* (2013.01); *B63H 2021/216* (2013.01); *B63H 2025/022* (2013.01); *B63H 2025/026* (2013.01)

(58) Field of Classification Search
CPC ...... B63H 20/12; B63H 21/213; B63H 25/02; B63H 2020/003; B63H 2025/022; B63H 2025/026
See application file for complete search history.

(56) References Cited

U.S. PATENT DOCUMENTS

| | | |
|---|---|---|
| 3,976,023 A | 8/1976 | Noguchi et al. |
| 6,234,853 B1 | 5/2001 | Lanyi et al. |
| 6,994,046 B2 | 2/2006 | Kaji et al. |
| 9,248,898 B1 * | 2/2016 | Kirchhoff ............ B63H 21/213 |
| 9,690,295 B1 * | 6/2017 | Abellera .............. G05D 1/0206 |

* cited by examiner

*Primary Examiner* — Todd M Melton

(74) *Attorney, Agent, or Firm* — BCF LLP

(57) ABSTRACT

A joystick system and a watercraft using the system are presented. The system includes a joystick having a low range of motion spanning from a rest angle to a threshold angle, and a high range of motion spanning from the threshold angle to a maximum angle; a joystick position sensor for producing signals indicative of a position of the joystick and a control for producing engine thrust request signals to control a resultant thrust of two thrust generation devices in response to receiving the signals from the joystick position sensor, the resultant thrust increasing from a minimum to a threshold thrust at a first rate of increase as the joystick moves from the rest angle toward the threshold angle, the resultant thrust increasing from the threshold thrust to a maximum thrust at a second greater rate of increase as the joystick moves from the threshold angle toward the maximum angle.

20 Claims, 9 Drawing Sheets

JOYSTICK SYSTEM FOR A WATERCRAFT

CROSS-REFERENCE

The present application claims priority to U.S. Patent Application No. 62/289,086 filed on Jan. 29, 2016, the entirety of which is incorporated herein by reference.

TECHNICAL FIELD

The present technology relates to a joystick system for a watercraft and a watercraft providing a joystick system.

BACKGROUND

Joystick piloting systems can be implemented for watercraft with two or more outboard engines and are used in situations such as docking where manoeuvrability, at generally low speeds, is important. An operator engages a two-axis joystick that directs the watercraft in two-dimensional translational movement by pivoting the joystick about its base. In some systems, an additional third axis control is added wherein the operator twists the joystick to adjust yaw (rotating the watercraft about a central vertical axis). Movement of the joystick is converted into throttle and steering instructions for each outboard engine, where a resultant thrust from the two or more engines create translational motion of the watercraft. The joystick has linear resistance force as the joystick is pushed to its maximum, such that the farther the joystick is pushed, the greater the thrust that is requested.

Examples of such joystick systems for watercraft are described in U.S. Pat. Nos. 3,976,023, 6,234,853, and 6,994,046, the entirety of each of which is incorporated herein by reference.

Some situations require additional resultant thrust from the two or more outboard engines. This can be the case, for example, when attempting to dock the watercraft in high current or wind conditions. In some systems, a button for increasing the resultant thrust, a boosted thrust mode, is provided. During difficult manoeuvers, however, it may be difficult or prohibitively slow to activate the increased thrust mode via the button.

There has therefore developed a need for a joystick system which allows translational control of the watercraft and a simple initiation of a boosted thrust mode.

SUMMARY

It is an object of the present to ameliorate at least some of the inconveniences present in the prior art.

According to an aspect of the present technology, there is provided a joystick system for a watercraft, the watercraft having at least two thrust generation devices, the joystick system comprising a joystick pivotable about an axis, the joystick having a low range of motion about the axis, the low range spanning from a rest angle to a threshold angle, and a high range of motion about the axis, the high range spanning from the threshold angle to a maximum angle; at least one joystick position sensor operatively connected to the joystick, the at least one joystick position sensor being adapted for producing pivot signals indicative of a position of the joystick about the axis; and a control module operatively connected to the at least one joystick position sensor, the control module producing engine thrust request signals operative to control a resultant thrust of the at least two thrust generation devices in response to receiving the pivot signals from the at least one joystick position sensor, the resultant thrust increasing from a minimum thrust to a threshold thrust at a first rate of increase as the joystick moves from the rest angle toward the threshold angle in the low range, the resultant thrust increasing from the threshold thrust to a maximum thrust at a second rate of increase as the joystick moves from the threshold angle toward the maximum angle in the high range, the second rate of increase being greater than the first rate of increase.

In some implementations of the present technology, movement of the joystick about the axis causes the control module to produce the engine thrust request signals operative to control the resultant thrust such that the watercraft moves in at least one of a forward direction and a backward direction.

In some implementations of the present technology, the axis is a first axis; the low range from the rest angle to the threshold angle is a first low range from the rest angle to a first threshold angle; the high range from the threshold angle to the maximum angle is a first high range from the first threshold angle to a first maximum angle; and the joystick is further pivotable about a second axis, the joystick further having a second low range of motion about the second axis, the second low range spanning from the rest angle to a second threshold angle, and a second high range of motion about the second axis, the second high range spanning from the second threshold angle to a second maximum angle; the at least one joystick position sensor is further adapted for producing pivot signals indicative of a position of the joystick about the second axis; and the control module further produces engine thrust request signals operative to control the resultant thrust of the at least two thrust generation devices in response to receiving the pivot signals from the at least one joystick position sensor, the resultant thrust increasing from the minimum thrust to the threshold thrust at a third rate of increase as the joystick moves from the rest angle toward the second threshold angle in the second low range, the resultant thrust increasing from the second threshold thrust to a second maximum thrust at a fourth rate of increase as the joystick moves from the second threshold angle toward the second maximum angle in the second high range, the fourth rate of increase being greater than the third rate of increase.

In some implementations of the present technology, the first and third rates of increase are equal and the second and fourth rates of increase are equal.

In some implementations of the present technology, movement of the joystick about the second axis causes the control module to produce engine thrust request signals operative to control the resultant thrust such that the watercraft moves in at least one of a starboard direction and a port direction.

In some implementations of the present technology, a first total range of motion is defined by a sum of the first low range and the first high range; a second total range of motion is defined by a sum of the second low range and the second high range; and the first and second total ranges of motion are equal.

In some implementations of the present technology, the joystick defines a rotation axis, the joystick being adapted for twisting about the rotation axis, and twisting the joystick about the rotation axis causes the control module to produce engine thrust request signals operative to control a yaw motion of the watercraft.

In some implementations of the present technology, the threshold angle is about 80% of the maximum angle.

In some implementations of the present technology, the joystick system further comprises a feedback mechanism adapted for indicating to an operator that the joystick has moved from one of the low and high ranges to an other one of the low and high ranges.

In some implementations of the present technology, the feedback mechanism is a tactile feedback mechanism.

In some implementations of the present technology, the tactile feedback mechanism is a variable biasing mechanism, the variable biasing mechanism biasing the joystick towards the rest angle with a first resistance force when the joystick is within the low range and with a second resistance force when the joystick is within the high range, the second resistance force being greater than the first resistance force.

In some implementations of the present technology, the variable biasing mechanism comprises a ramp disposed adjacent the joystick, the ramp having a first zone having a first slope with respect to the joystick at the rest angle, and a second zone having a second slope, with respect to the joystick at the rest angle, the second slope being greater than the first slope; a boot movably disposed about the joystick; a spring engaging the joystick at a first end and engaging the boot at a second end; and wherein the boot contacts the first zone of the ramp in the low range of motion of the joystick, the first slope causing the boot to move with respect to the joystick and compress the spring at a first rate, the boot contacts the second zone of the ramp in the high range of motion of the joystick, the second slope causing the boot to move with respect to the joystick and compress the spring at a second rate, the second rate being greater than the first rate.

In some implementations of the present technology, the feedback mechanism is a light indicator.

In some implementations of the present technology, the control module is adapted for controlling a steering position of the at least two thrust generation devices.

According to another aspect of the present technology, there is provided a watercraft comprising a hull; a deck disposed on the hull; at least two thrust generation devices operatively connected to one of the hull and the deck; a joystick system operatively connected to the at least two thrust generation devices, the joystick system comprising a joystick pivotable about an axis, the joystick having a low range of motion about the axis, the low range spanning from a rest angle to a threshold angle, and a high range of motion about the axis, the high range spanning from the threshold angle to a maximum angle; a joystick position sensor operatively connected to the joystick, the joystick position sensor being adapted for producing pivot signals in response to sensing the joystick pivoting about the axis; and a control module operatively connected to the joystick position sensor, the control module producing engine thrust request signals operative to control a resultant thrust of the at least two thrust generation devices in response to receiving the pivot signals from the joystick position sensor, the resultant thrust increasing from a minimum thrust to a threshold thrust at a first rate of increase as the joystick moves from the rest angle toward the threshold angle in the low range, the resultant thrust increasing from the threshold thrust to a maximum thrust at a second rate of increase as the joystick moves from the threshold angle toward the maximum angle in the high range, the second rate of increase being greater than the first rate of increase.

In some implementations of the present technology, the watercraft further comprises a steering wheel operatively connected to the deck; a throttle lever operatively connected to the deck, the steering wheel and the throttle lever being adapted for controlling motion of the watercraft; and wherein the control module is adapted to redirect control of motion of the watercraft from the steering wheel and the throttle lever to the joystick system when a joystick system control mode initiated by an operator via the control module, the at least two thrust generation devices are at least two outdrives, and the control module controls the at least two outdrives to rotate to a splayed arrangement when the joystick system control mode is initiated by the operator.

In some implementations of the present technology, the control module controls the at least two outdrives to be disposed in a splayed arrangement when the joystick is in the low range and the control module controls the at least two outdrives to be in a forward-facing arrangement when the joystick is in the high range.

In some implementations of the present technology, movement of the joystick about the axis causes the control module to produce engine thrust request signals operative to control the resultant thrust such that the watercraft moves in at least one of a forward direction and a backward direction.

In some implementations of the present technology, the axis is a first axis; the low range from the rest angle to the threshold angle is a first low range from the rest angle to a first threshold angle; the high range from the threshold angle to the maximum angle is a first high range from the first threshold angle to a first maximum angle; and the joystick is further pivotable about a second axis, the joystick further having a second low range of motion about the second axis, the second low range spanning from the rest angle to a second threshold angle, and a second high range of motion about the second axis, the second high range spanning from the second threshold angle to a second maximum angle.

In some implementations of the present technology, movement of the joystick about the second axis causes the control module to produce engine thrust request signals operative to control the resultant thrust such that the watercraft moves in at least one of a starboard direction and a port direction.

In some implementations of the present technology, a first total range of motion is defined by a sum of the first low range and the first high range; a second total range of motion is defined by a sum of the second low range and the second high range; and the first and second total ranges of motion are equal.

In some implementations of the present technology, the joystick defines a rotation axis, the joystick being adapted for twisting about the rotation axis, and twisting the joystick about the rotation axis causes the control module to produce engine thrust request signals operative to control a yaw motion of the watercraft.

In some implementations of the present technology, the watercraft further comprises a feedback mechanism adapted for indicating to an operator that the joystick has moved from one of the low and high ranges to an other one of the low and high ranges.

According to another aspect of the present technology, there is provided a method for controlling movement of a watercraft using a joystick system, the joystick system having a joystick operatively connected to at least one joystick position sensor, the joystick position sensor being operatively connected to a control module, the control module being adapted for controlling at least two thrust generation devices of the watercraft, the method comprising the steps of: in response to the control module receiving a signal from the at least one joystick position sensor indicative of the joystick being pushed forward about a first axis from a rest angle, sending, by the control module, signals operative to move the watercraft in a forward direction at a first rate of increase of a resultant thrust of the at least two thrust generation devices; in response to the control module receiving a signal from the at least one joystick position sensor indicative of the joystick being pushed forward past a threshold angle, sending, by the control module, signals operative to move the watercraft in the forward direction at a second rate of increase of the resultant thrust of the at least two thrust generation devices, the second rate of increase being greater than the first rate of increase; and in response to the control module receiving a signal from the at least one joystick position sensor indicative of the joystick being returned to the rest angle, sending, by the control module, signals operative decrease the resultant thrust of the at least two thrust generation devices.

In some implementations of the present technology, the method further comprises the steps of: in response to the control module receiving a signal from the at least one joystick position sensor indicative of the joystick being pushed rightward about a second axis from the rest angle, sending, by the control module, signals operative to move the watercraft in a starboard direction at a third rate of increase of the resultant thrust of the at least two thrust generation devices; in response to the control module receiving a signal from the at least one joystick position sensor indicative of the joystick being pushed rightward past a second threshold angle, sending, by the control module, signals operative to move the watercraft in the starboard direction at a fourth rate of increase of the resultant thrust, the third rate of increase being greater than the fourth rate of increase; and in response to the control module receiving the signal from the at least one joystick position sensor indicative of the joystick being returned to the rest angle, sending, by the control module, signals operative decrease the resultant thrust of the at least two thrust generation devices.

In some implementations of the present technology, the first and third rates of increase are equal; and the second and fourth rates of increase are equal.

In some implementations of the present technology, the at least two thrust generation devices are outdrives; the at least two outdrives are in a splayed arrangement; and in response to the control module receiving the signal from the at least one joystick position sensor indicative of the joystick being pushed forward past the threshold angle, the control module further sends signals operative to rotate the at least two outdrives into a forward-facing arrangement.

According to yet another aspect of the present technology, there is provided a joystick system for controlling a device. The joystick system includes a joystick pivotable about an axis, the joystick having a low range of motion about the axis, the low range spanning from a rest angle to a threshold angle, and a high range of motion about the axis, the high range spanning from the threshold angle to a maximum angle; at least one joystick position sensor operatively connected to the joystick, the at least one joystick position sensor being adapted for producing pivot signals indicative of a position of the joystick about the axis; and a feedback mechanism adapted for indicating to an operator that the joystick has moved from one of the low and high ranges to an other one of the low and high ranges.

In some implementations of the present technology, the joystick system further comprises a control module operatively connected to the at least one joystick position sensor, the control module producing signals operative to control the device in response to receiving the pivot signals from the at least one joystick position sensor, the control module producing at least one first signal operative to control the device as the joystick moves from the rest angle toward the threshold angle in the low range, the control module producing at least one second signal operative to control the device as the joystick moves from the threshold angle toward the maximum angle in the high range.

In some implementations of the present technology, the axis is a first axis; the low range from the rest angle to the threshold angle is a first low range from the rest angle to a first threshold angle; the high range from the threshold angle to the maximum angle is a first high range from the first threshold angle to a first maximum angle; and the joystick is further pivotable about a second axis, the joystick further having a second low range of motion about the second axis, the second low range spanning from the rest angle to a second threshold angle, and a second high range of motion about the second axis, the second high range spanning from the second threshold angle to a second maximum angle; the at least one joystick position sensor is further adapted for producing pivot signals indicative of a position of the joystick about the second axis.

In some implementations of the present technology, the joystick system further comprises a control module operatively connected to the at least one joystick position sensor, the control module producing signals operative to control the device in response to receiving the pivot signals from the at least one joystick position sensor, the control module producing at least one first signal operative to control the device as the joystick moves from the rest angle toward the first threshold angle in the first low range, the control module producing at least one second signal operative to control the device as the joystick moves from the first threshold angle toward the first maximum angle in the first high range, the control module producing at least one third signal operative to control the device as the joystick moves from the rest angle toward the second threshold angle in the second low range, and the control module producing at least one fourth signal operative to control the device as the joystick moves from the second threshold angle toward the second maximum angle in the second high range.

In some implementations of the present technology, the joystick defines a rotation axis, the joystick being adapted for twisting about the rotation axis, and twisting the joystick about the rotation axis causes the control module to produce at least one third signal operative to control the device.

In some implementations of the present technology, the threshold angle is about 80% of the maximum angle.

In some implementations of the present technology, the feedback mechanism is a tactile feedback mechanism.

In some implementations of the present technology, the tactile feedback mechanism is a variable biasing mechanism, the variable biasing mechanism biasing the joystick toward the rest angle with a first resistance force when the joystick is within the low range and with a second resistance force when the joystick is within the high range, the second resistance force being greater than the first resistance force.

In some implementations of the present technology, the variable biasing mechanism comprises a ramp disposed adjacent the joystick, the ramp having a first zone having a first slope with respect to the joystick at the rest angle, and a second zone having a second slope, with respect to the joystick at the rest angle, the second slope being greater than the first slope; a boot movably disposed about the joystick; a spring engaging the joystick at a first end and engaging the boot at a second end; and wherein the boot contacts the first zone of the ramp in the low range of motion of the joystick, the first slope causing the boot to move with respect to the joystick and compress the spring at a first rate, the boot contacts the second zone of the ramp in the high range of motion of the joystick, the second slope causing the boot to move with respect to the joystick and compress the spring at a second rate, the second rate being greater than the first rate.

In some implementations of the present technology, the feedback mechanism is a light indicator.

According to yet another aspect of the present technology, there is provided a joystick system for controlling a device, the joystick system comprising a joystick pivotable about an axis, the joystick having a low range of motion about the axis, the low range spanning from a rest angle to a threshold angle, and a high range of motion about the axis, the high range spanning from the threshold angle to a maximum angle; a ramp disposed adjacent the joystick, the ramp having a first zone having a first slope with respect to the joystick at the rest angle, and a second zone having a second slope, with respect to the joystick at the rest angle, the second slope being different than the first slope; a boot movably disposed about the joystick; a spring engaging the joystick at a first end and engaging the boot at a second end, the boot contacting the first zone of the ramp in the low range of motion of the joystick, the first slope causing the boot to move with respect to the joystick and compress the spring at a first rate, the boot contacting the second zone of the ramp in the high range of motion of the joystick, the second slope causing the boot to move with respect to the joystick and compress the spring at a second rate, the second rate being different than the first rate; and at least one joystick position sensor operatively connected to the joystick, the at least one joystick position sensor being adapted for producing pivot signals indicative of a position of the joystick about the axis.

In some implementations of the present technology, the joystick system further comprises a control module operatively connected to the at least one joystick position sensor, the control module producing signals operative to control the device in response to receiving the pivot signals from the at least one joystick position sensor.

For purposes of this application, terms related to spatial orientation such as forwardly, rearward, upwardly, downwardly, left, and right, are as they would normally be understood by an operator of the watercraft riding thereon in a normal driving position. Terms related to spatial orientation when describing or referring to components or sub-assemblies of the watercraft, separately from the watercraft, should be understood as they would be understood when these components or sub-assemblies are mounted on the watercraft, unless specified otherwise in this application.

Should there be contradictions between the definitions of terms provided in documents incorporated herein by reference and definitions of such terms provided in the present application, the definitions in the present application prevail.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

A joystick system for a watercraft will be described with respect to a watercraft with two thrust generation devices. Thrust generation devices may include, but are not limited to, outdrives such as outboard engines, stern drives, and pod drives, as well as thrusters such as bow and stern thrusters, and trolling motors, and combinations of the preceding. The watercraft as described below is propelled by two outboard engines, each having in internal combustion engine. It is also contemplated that the joystick system could be used for different types of watercraft driven by at least two thrust generation devices, including, but not limited to, speed boats and sport boats.

Figure 1:
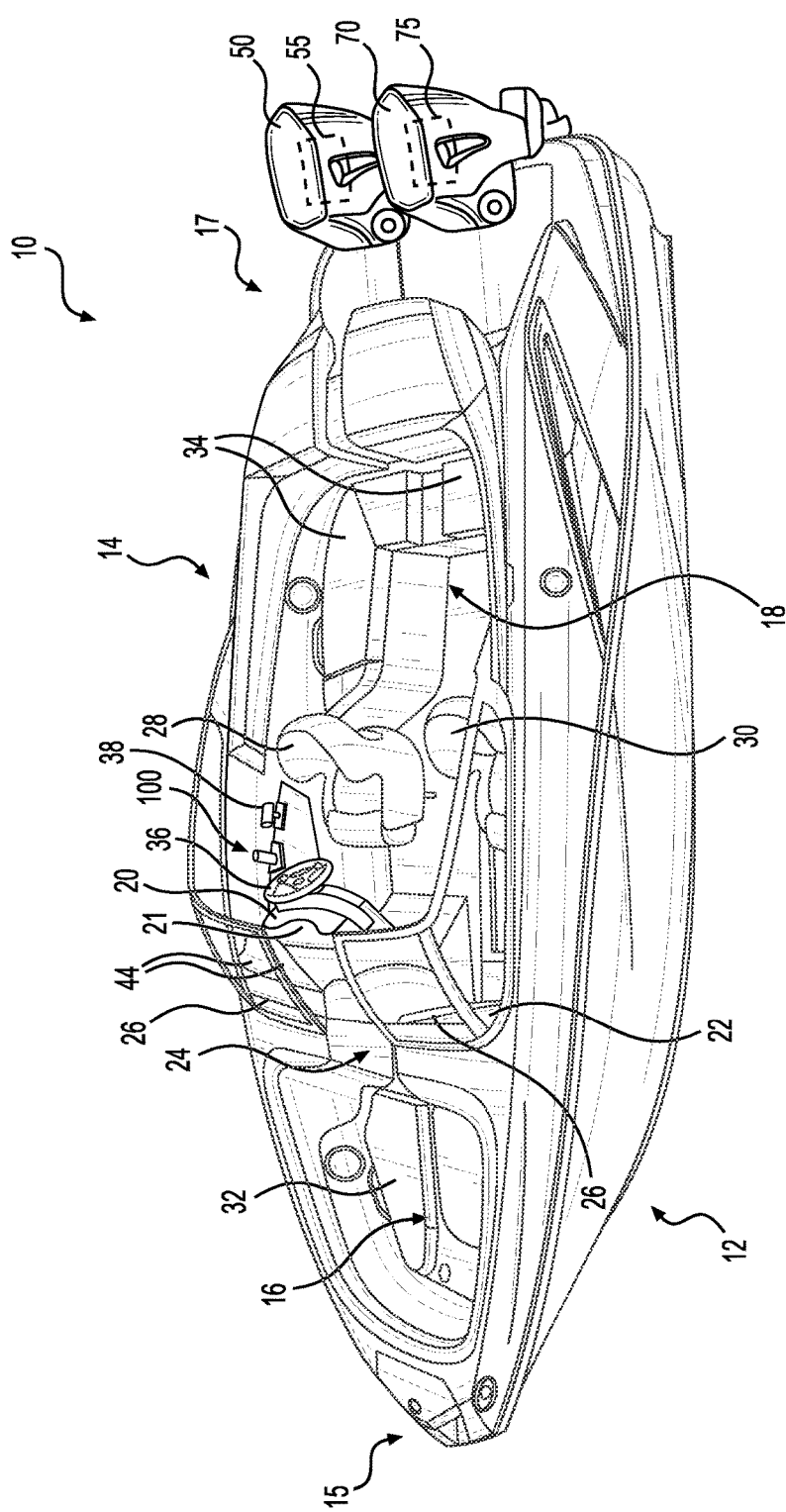
FIG. 1 is a top, left side perspective view of a watercraft.

The general construction of the watercraft 10 is illustrated in FIG. 1. It should be understood that the watercraft 10 could have a construction other than the one described below.

The watercraft 10 has a hull 12 and a deck 14 supported by the hull 12. The watercraft has a front 15 and a rear 17. The deck 14 has a forward passenger area 16 and a rearward passenger area 18. A right console 21 including a dashboard 20 and a left console 22 are disposed on either side of the deck 14 between the two passenger areas 16, 18. A passageway 24 disposed between the two consoles 21, 22 allows for communication between the two passenger areas 16, 18. Windshields 26 are provided over the consoles 21, 22.

A driver seat 28 and a passenger seat 30 are disposed behind the consoles 20 and 22 respectively. Seats 32 and 34 are also provided in the forward and rearward passenger areas 16 and 18 respectively. The dashboard 20 is provided with a steering wheel 36 used by an operator of the watercraft 10 to steer. A steering column assembly (not shown) includes a steering column (not shown) that rotates with the steering wheel 36. A joystick system 100 is also provided for steering the watercraft 10 and will be described in more detail below.

The watercraft 10 has a twin engine arrangement. The watercraft 10 includes an outboard engine 50 with an internal combustion engine 55 to a rear, starboard side of the watercraft 10 and an outboard engine 70 with an internal combustion engine 75 toward a rear, port side of the watercraft 10. It is contemplated that the outboard engines 50, 70 could be equipped with different kinds of motors, including, but not limited to: electric motors and hybrid internal combustion-electric motors. The outboard engines 50, 70 are similar except that their propellers (not shown) turn in opposite directions during standard operation. The outboard engines 50, 70 are rotatably connected to the deck 14, but it is contemplated that the engines 50, 70 could be rotatably connected to the hull 12. A throttle lever 38 is provided to provide control of thrust created by the engines 50, 70. It is contemplated that two throttle levers 38 could be provided to separately control each of the engines 50, 70.

The watercraft 10 includes other features not described herein, such as electrical and fuel systems. It should be understood that such features are nonetheless present in the watercraft 10.

The watercraft 10 includes a joystick system 100, features of which will be described in more detail below. The joystick system 100 is provided to allow the operator of the watercraft 10 to have translational manoeuvrability at generally low speeds. The joystick system 100 also provides an integrated boosted thrust mode for simple initiation of increased thrust, using the joystick system 100.

Figure 2:
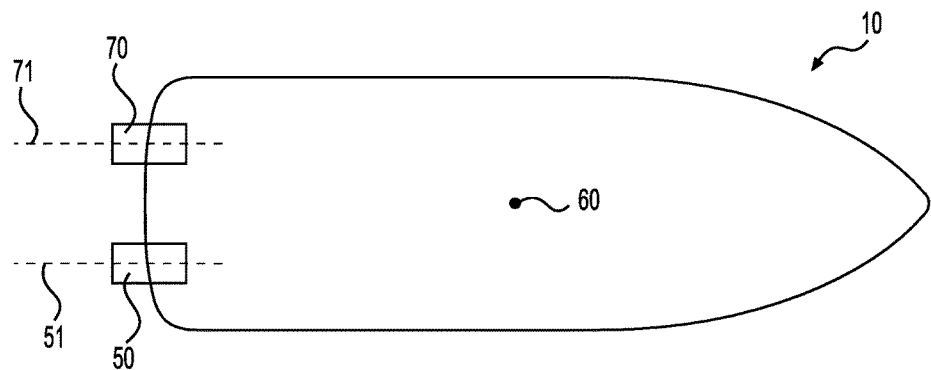
FIG. 2 is a schematic, top plan view of the two outboard engines, in a forward facing arrangement, and the watercraft of FIG. 1.

When the operator initiates a joystick control mode, control of steering and thrust of the two engines 50, 70 of the watercraft 10 are transferred from the steering wheel 36 and the throttle lever 38 to the joystick system 100. Upon entering the joystick control mode, the engines 50, 70 rotate from a forward facing arrangement, illustrated in FIG. 2, to a splayed arrangement. In the forward facing arrangement, center axes 51, 71 of the engines 50, 70 are generally perpendicular to the hull 12, and provide generally forward motion upon thrust from the engines 50, 70.

Figure 3:
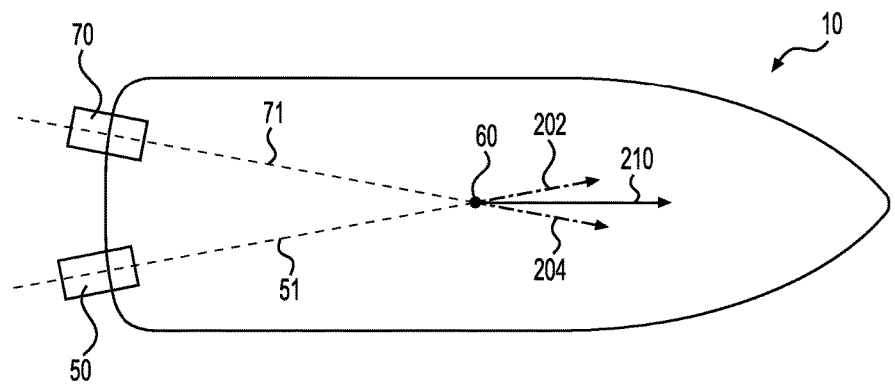
FIG. 3 is the schematic watercraft of FIG. 2, with the engines in a splayed arrangement producing forward resultant thrust.
Figure 4:
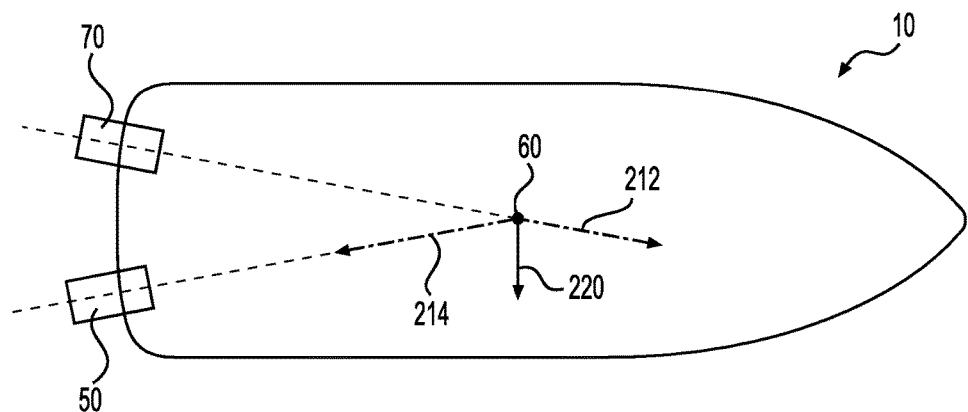
FIG. 4 is the schematic watercraft of FIG. 2, with the engines in the splayed arrangement producing resultant thrust toward a starboard side.
Figure 5:
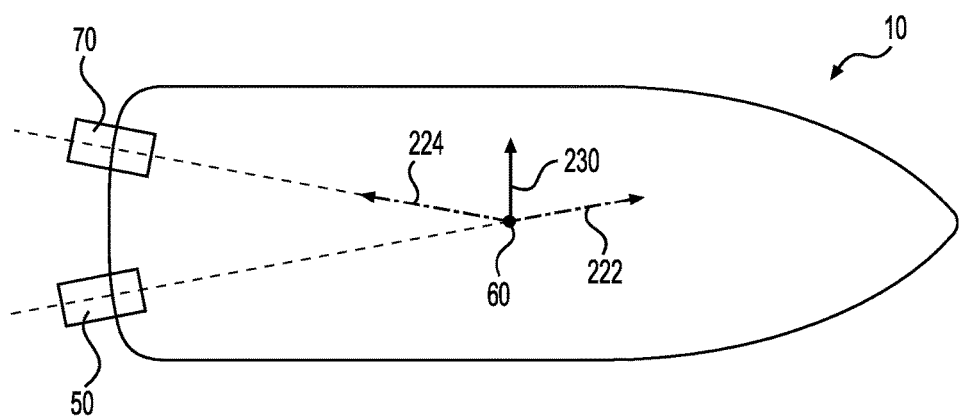
FIG. 5 is the schematic watercraft of FIG. 2, with the engines in the splayed arrangement producing resultant thrust toward a port side.

In the splayed arrangement, illustrated in FIGS. 3 to 5, the center axes 51, 71 of each of the engines 50, 70 are directed toward a center of mass 60 of the watercraft 10. The sum of the two thrusts combined at the center of mass 60 is referred to as a resultant thrust of the engines 50, 70. With the engines 50, 70 in the splayed arrangement with the resultant thrust at the center of mass 60 of the watercraft 10, generally translational motion (at generally low speeds) can be achieved. The true motion of the watercraft 10 will depend on operating conditions.

As an example, resultant thrust for forward motion can be produced for the watercraft 10 in the joystick control mode. As seen in FIG. 3, the engines 50, 70 are in the splayed arrangement, where their center lines 51, 71 are pointed at the center of mass 60. The starboard engine 50 produces a forward thrust 202 and the port engine 70 produces an equal forward thrust 204. The left and right components of the thrusts 202, 204 cancel at the center of mass 60 and the resultant thrust 210 retains only forward directed components of the thrusts 202, 204. Similarly, when the engines 50, 70 produce equal, rearward thrust, the resultant thrust (not shown) is toward the rear.

As shown in FIGS. 4 and 5, the resultant thrust can similarly be created toward the starboard or port directions, to create starboard and port translational motion of the watercraft 10. To produce starboard or port directed resultant thrust, the engines 50, 70 create oppositely directed thrust, with their center lines 51, 71 still aligned with the center of mass 60 in the splayed arrangement.

Starboard resultant thrust 220 is illustrated in FIG. 4, where the starboard engine 50 produces rearward directed thrust 214 and the port engine 70 produces forward directed thrust 212, with the thrusts 212, 214 being generally equal in strength. The forward and back components of the individual thrusts 212, 214 cancel, leaving the starboard directed resultant thrust 220 centered at the center of mass 60 of the watercraft 10, which can create starboard translational motion of the watercraft 10.

Similarly, port directed resultant thrust 230 is illustrated in FIG. 5, where the starboard engine 50 produces forward directed thrust 222 and the port engine 70 produces rearward directed thrust 224, with the thrusts 222, 224 being generally equal in strength. The forward and backward components of the individual thrusts 212, 214 cancel, leaving the port directed resultant thrust 220 centered at the center of mass 60 of the watercraft 10, in order to create port translational motion of the watercraft 10.

In addition, uneven thrust strength and steering of the engines 50, 70 to different angles in the splayed arrangement can be used to create various resultant thrust directions. For example, control of the yaw of the watercraft 10 cab be achieved using the engines 50, 70 in the splayed arrangement using uneven thrusts.

The joystick system 100 provides control of the resultant thrust of the watercraft 10, described with respect to FIGS. 6 to 10. The joystick system 100 is shown in partial cross-section in FIGS. 7 and 8 from a right side, pivoting about an axis 112. The joystick system 100 has equivalent features when seen from a front side, pivoting about a perpendicular axis 114. For simplicity, the features of the joystick system 100 will be described only from the right side, but the description applies equally to the front side. It is contemplated that the features as seen from the front side could vary from the features as seen from the right side.

The joystick system 100 provides a joystick 110 for the operator to control the resultant thrust of the two engines 50, 70. Specifically, the direction the joystick 110 is pivoted directs the direction of the resultant thrust, while the angle to which the joystick 110 is pivoted controls the strength of the resultant thrust. When the operator tilts the joystick 110 to high angles, the boosted thrust mode is initiated, as will be described in more detail below.

The joystick 110 pivotably connects within a housing 135. A flexible skirt 137 connected to the joystick 110 and the housing 135 is provided on an exterior of the joystick system 100. The flexible skirt 137 allows the joystick 110 to move, while deterring water and debris from entering the housing 135. The flexible skirt 137 is made of a flexible, watertight material, which could include, but is not limited to, treated cloth material and flexible plastics. It is contemplated that the flexible skirt 137 could cover more or less of the joystick 110 and/or the housing 135, depending on the implementation. It is also contemplated that the shape and size of the joystick 110 and the housing 105 could vary depending on the implementation.

The joystick 110 connects within the housing 135 via a spherical joint 102. The spherical joint 102 allows the joystick 110 to pivot and twist. The housing 135 also contains, at least in part, a joystick position sensor 120 for sensing an angular position of the joystick 110. The joystick position sensor 120 is contained within the housing 135, but it is contemplated that some components of the joystick position sensor 120 could be disposed within the housing 135 while other components could be outside of the housing 135.

A control module 130 is operatively connected to the joystick position sensor 120 and the two engines 50, 70. The control module 130 receives pivot signals from the joystick position sensor 120 indicative of the angular position of the joystick 110. The control module 130 then, in response, sends signals operative to control the engines 50 and 70. These signals control throttle strength and direction of the engines 50, 70, along with the orientation and steering positions of the engines 50, 70 with respect to the hull 12. The control module 130 is located to an exterior of the housing 135, as indicated schematically in FIG. 6.

Figure 9:
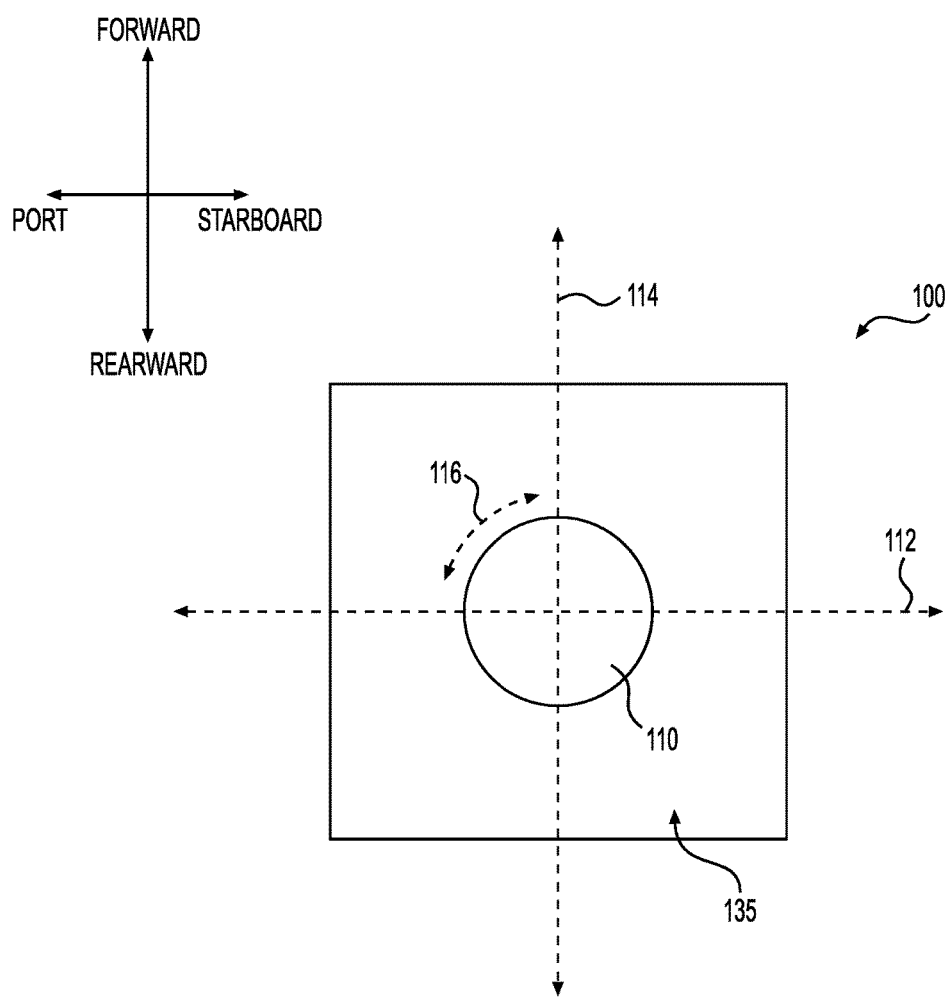
FIG. 9 is a schematic, top plan view of the joystick system of FIG. 6.

The operator controls the direction of the watercraft 10 by pivoting the joystick 110 about the axes 112, 114, illustrated in FIG. 9. By pivoting the joystick 110 forward or backward about the axis 112, the control module 130 sends signals the engines 50, 70 to produce resultant thrust forward or backward, respectively. Similarly, pivoting the joystick 110 to the right or left about the axis 114 causes the control module 130 to send signals to the engines 50, 70 to produce resultant thrust toward the starboard or port, respectively. It is contemplated that the joystick 110 could pivot about different axes. It is also contemplated that the axes 112, 114 could be disposed at a different angle to one another than perpendicular. It is further contemplated that the joystick 110 could be pivotable in 360 degrees, directing the resultant thrust in any number of directions.

Control of the yaw, movement about a vertical axis of the watercraft 10, is also provided by the joystick 110. The joystick 110 defines a rotational axis 116 about which the joystick 110 can be twisted. It is contemplated that the joystick 110 may not twist in some implementations. It is also contemplated that yaw control could be provided by a different feature than the joystick 110.

The joystick 110 has a total angular range of motion 166 about the axes 112, 114. The total range 166 is defined between a rest angle 150 and a maximum angle 154. It should be noted that the joystick 110 can be pivoted to any angle between the rest angle 150 and the maximum angle 154. As mentioned above, the angular displacement of the joystick 110 corresponds to the strength of resultant thrust requested from the engines 50, 70. As such, the range of motion 166 corresponds to the range of resultant thrust that may be requested by the joystick system 100.

Figure 6:
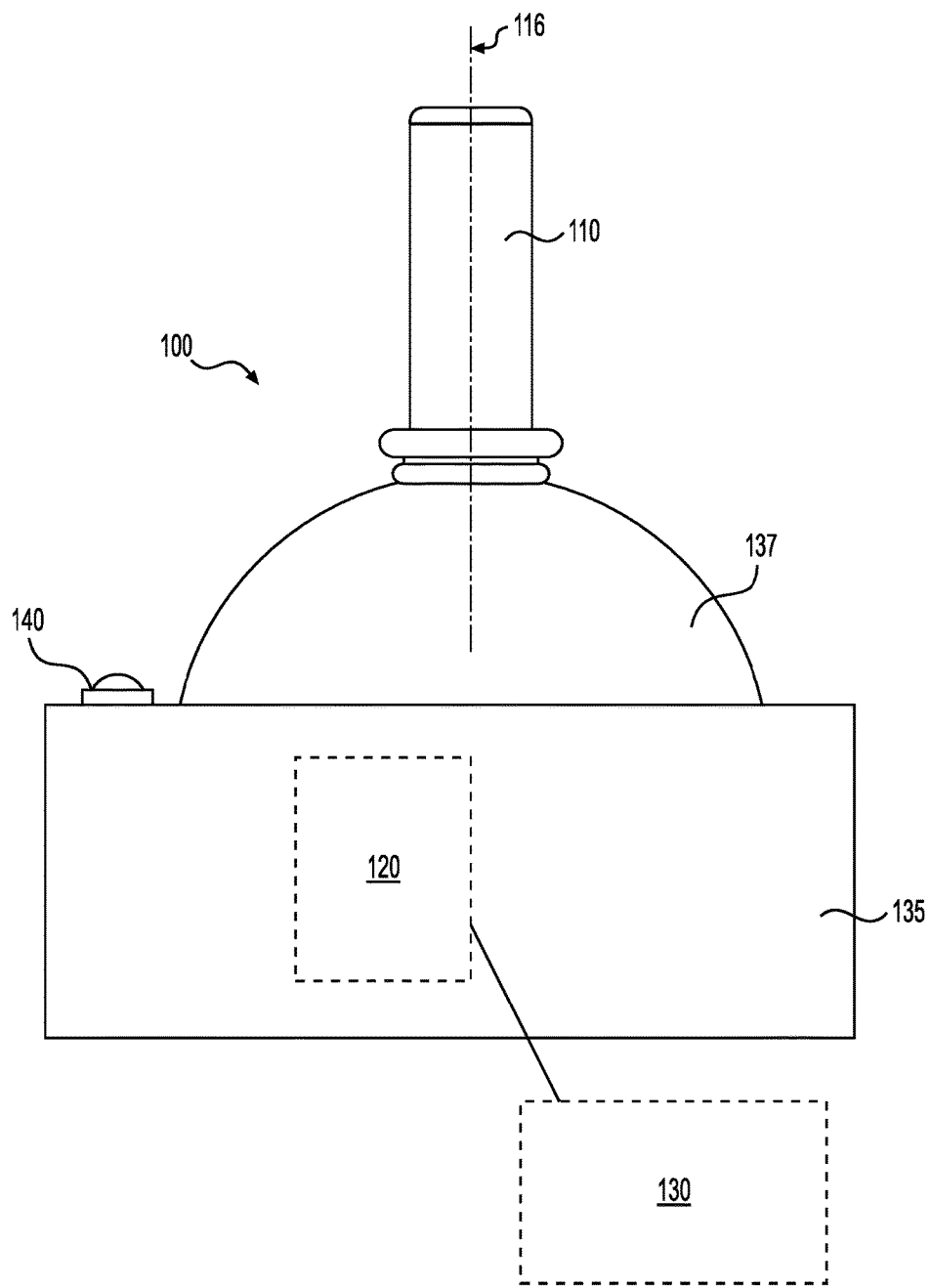
FIG. 6 is a right side elevation view of a joystick system.

At the rest angle 150, a minimum resultant thrust is produced; the engines 50, 70 are idling. The joystick 110 generally stays at or returns to the rest angle 150 when the joystick 110 is not being manipulated by the operator. The control module 130, when receiving signals from the joystick position sensor 110 that the joystick 110 is returning to the rest angle 150, in turn sends signals to the engines 50, 70 to reduce the resultant thrust. As is illustrated in FIG. 6, the joystick 110 is generally vertical at the rest angle 150.

Figure 8:
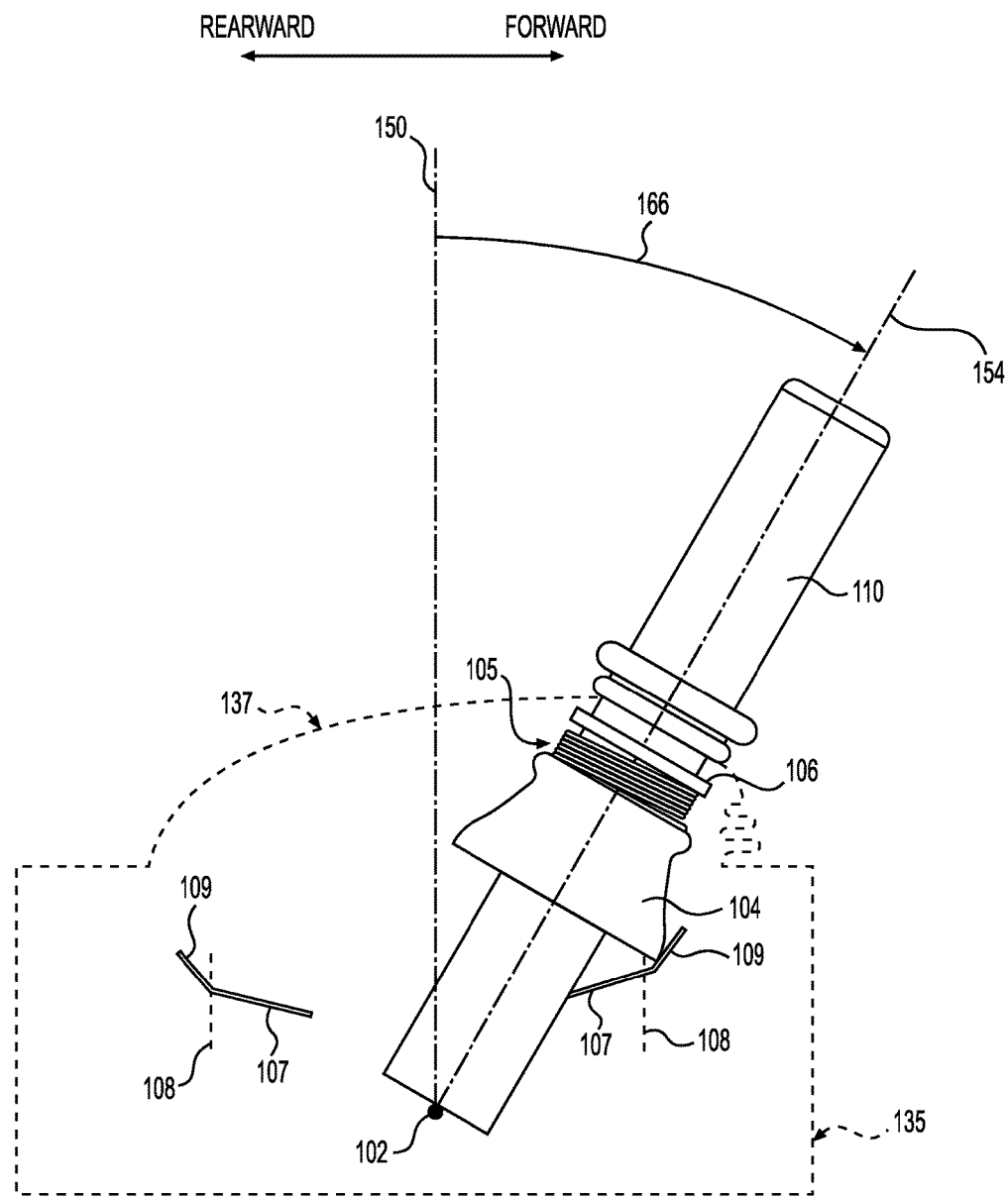
FIG. 8 is the right side elevation view of the joystick of FIG. 7, with the joystick pivoted to its maximum angle.

At the maximum angle 154, the resultant thrust is at a maximum limit of thrust allowed in the joystick control mode. In FIG. 8, the joystick 110 is shown at the maximum angle for the forward direction. The maximum angle 154 about the axis 114 (not shown) is the same as the maximum angle 154 about the axis 112. It is contemplated that the maximum angle 154 could be different for the different axes 112, 114, depending on the implementation. It is also contemplated that the value of the maximum resultant thrust allowed in joystick control mode could vary, depending on the watercraft 10 implementing the joystick system 100.

Figure 7:
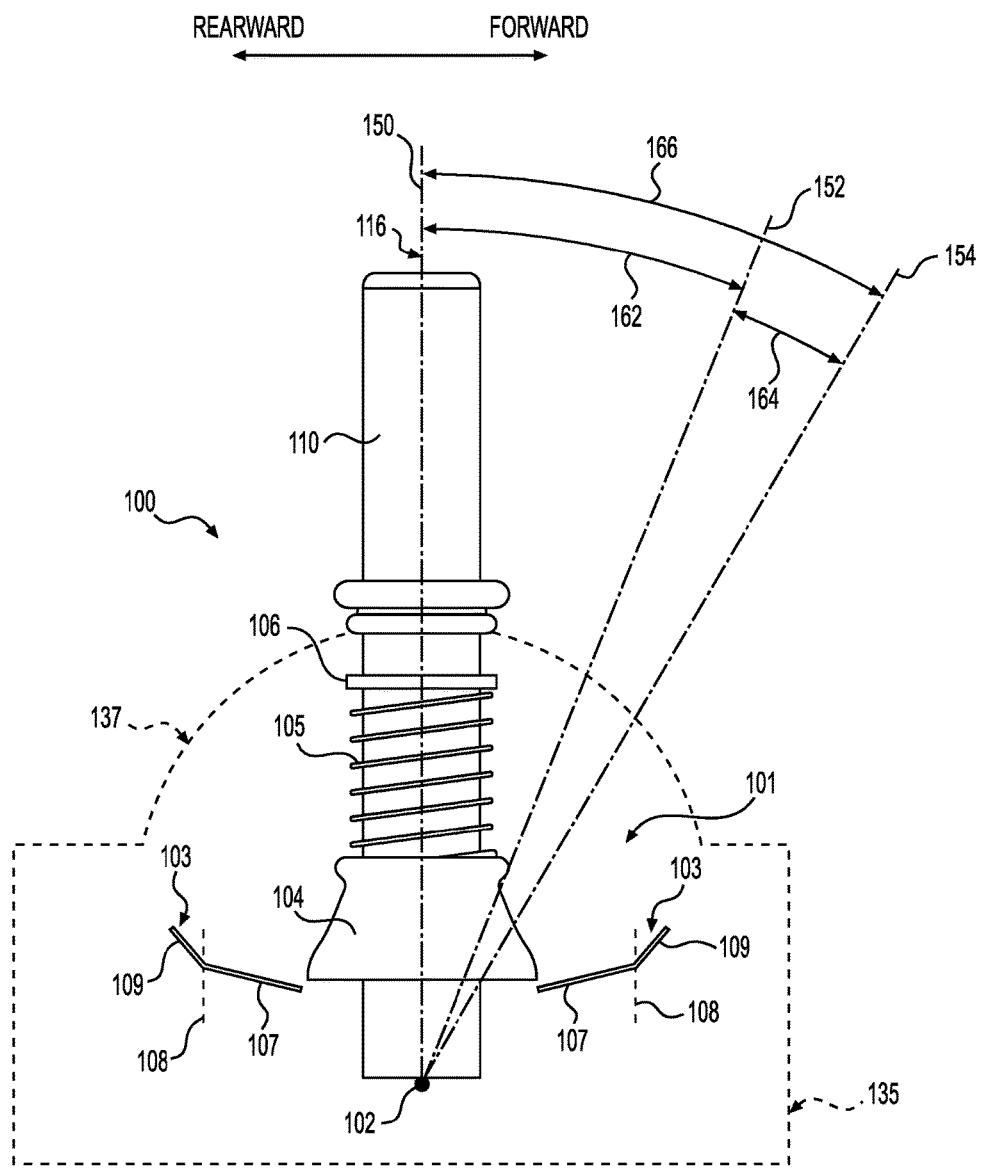
FIG. 7 is a right side elevation view of a joystick of the joystick system of FIG. 6, shown in a partial cross-section.

The joystick 110 also has a threshold angle 152, which delineates between a low range of motion 162 and a high range of motion 164. These ranges are illustrated in FIG. 7 and, combined, span the entire range of motion 166. In the low range 162, the control module 130 directs the engines 50, 70 to increase the resultant thrust at a first linear rate 310 (FIG. 10) as the operator pushes the joystick 110 away from the rest angle 150.

Figure 10:
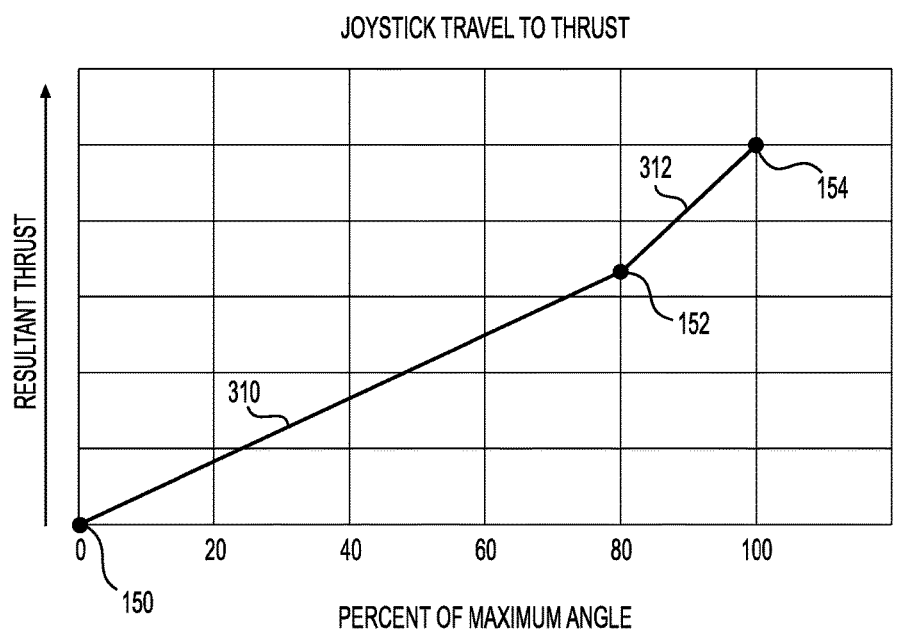
FIG. 10 is a graph depicting the relationship between an angle of the joystick and the resultant thrust.

As the operator pushes the joystick 110 past the threshold angle 152, the joystick system 100 enters the boosted thrust mode. As such the operator can access an increased resultant thrust by simply pushing the joystick 110 farther away from vertical. In the high range 164, the control module 130 directs the engines 50, 70 to increase the resultant thrust at a second linear rate 312 (FIG. 10). This is the boosted thrust mode, the resultant thrust increasing at the second linear rate 312 which is greater than the first rate 310. As illustrated in FIG. 10, for the same angular displacement, the magnitude of the resultant thrust increases more when the joystick 110 is in the high range 164 than when it is in the low range 162. In some implementations, the control module 130 causes the engines 50, 70 to rotate back to the forward facing arrangement when the joystick 110 enters the high range 164. In some implementations, it is also contemplated that the rates 310, 312 could be non-linear rates of thrust change.

The threshold angle 152 is positioned at about 80% of the maximum angle 154, wherein the operator must push through 80% of the total range of motion 166 of the joystick 110 in order to engage the higher rate of increase 312 of the resultant thrust of the higher range 164. It is contemplated that the threshold angle 152 could be closer or farther from the rest angle 150, depending on the implementation.

The features of the joystick control mode, such as the total range 166, the maximum thrust corresponding to the maximum angle 154, and the rates 310, 312, are the same for the joystick 110 when pivoted about the axis 114 as has been described herein with respect to the axis 112, although the descriptions have not been repeated for simplicity. It is contemplated, however, that any number of features of the system 100 could vary depending on the direction of pivot in different implementations.

The joystick system 100 includes a tactile feedback mechanism 101 for alerting the operator that the joystick 110 has been pushed from the low range 162 to the high range 164 (or from the high range 164 to the low range 162). The tactile feedback mechanism 101 is a variable biasing mechanism 101, which also serves to help return the joystick 110 to the rest angle 150.

Generally, the joystick 110 is biased toward the rest angle 150 with a certain resistance force when the joystick 110 is in the low range 162 and with higher resistance force when the joystick 110 is in the high range 164. As such the operator encounters greater resistance when the joystick 110 is pushed past the threshold angle 152 and is thereby alerted that the joystick 110 has entered the high range 164. Similarly, when the joystick 110 passes from the high range 164 to the low range 162, the operator encounters less resistance as the joystick 110 is pushed past the threshold angle 152 toward the rest angle 150.

Specifically, the variable biasing mechanism 101 includes a spring 105 coiled co-axially around the joystick 110. At one end, the spring 105 engages a fixed ring 106, which is fixed relative to the joystick 110. At the other end, the spring 105 engages a boot 104. The boot 104 is disposed around the joystick 110, and is free to move along the joystick 110. Within the housing 135, disposed in a circle around the joystick 110 and boot 104, is a ramp 103. It is contemplated that the ramp 103 may be disposed only at discrete locations about the joystick 110.

The ramp 103 has a low range zone 107 having a low slope with respect to the joystick 110 in the rest position 150. As the joystick 110 is pivoted, the boot 104 contacts the low range zone 107 of the ramp 103 and the ramp 103 causes the boot 104 to slide up with respect to the joystick 110 and compress the spring 105.

Starting from a threshold point 108 on the ramp 103 is a high range zone 109 having a steeper slope than the low slope of the low range zone 107. At the threshold angle 152, the boot 104 contacts the threshold point 108. As the joystick 110 pivots into the high range 164, the boot 104 contacts the high range zone 109 of the ramp 103. As before, the ramp 103 causes the boot 104 to slide upwards with respect to the joystick 110 and compress the spring 105. Due to the steeper slope, however, the spring 105 is compressed at a higher rate. As compressing the spring 105 at a higher rate takes more energy, the operator experiences greater resistance in moving the joystick 110 in the high range 164 than in the low range 162.

When released by the operator, the joystick 110 is biased back toward the rest angle 150 by the spring 105. Having been compressed by the boot 104 and the ramp 103, the spring 105 will naturally try to return to its extended position (when the joystick 110 is at the rest angle 150) and push out the boot 104. The boot 104 will push on the ramp 103 in turn, which pushes the joystick 110 back toward the rest angle 150. The operator may also manually return the joystick 110 to the rest angle 150.

It is contemplated that there could be additional biasing mechanisms for returning the joystick 110 to the rest angle 150. It is also contemplated that other tactile feedback mechanisms could be implemented in the present technology, including, but not limited to, variable pivot resistance, vibrational signals, and a ratcheting pivot.

In addition to the tactile feedback mechanism 101 indicating to the operator that the joystick 110 is in the high range 164, a visual indicator is provided. The joystick system 100 includes a visual indicator in the form of an indicator light 140 (FIG. 6) on the housing 135 to visually indicate to the operator of the watercraft 10 that the joystick 110 has entered or exited the high range 164. In addition to illumination of the indicator light 140, it is contemplated that the joystick 110 could have a detent inside the housing 105 to provide a tactile indication that the joystick 110 has entered the high range 164. It is also contemplated that the joystick system 100 could provide other indications that the joystick 110 has entered or exited the high range 164, including but not limited to: different visual indicators, and audio indications such as a bell sound.

Figure 11:
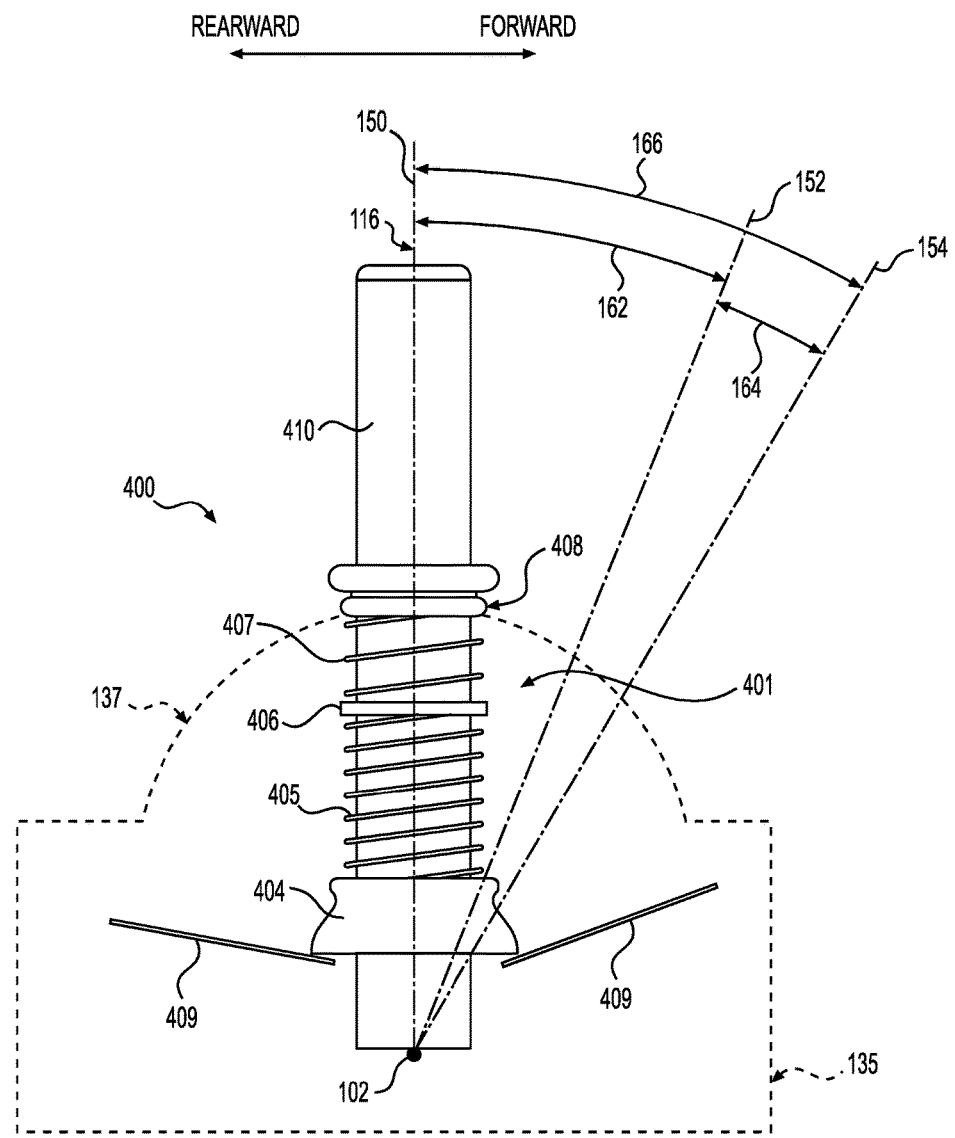
FIG. 11 is a right side elevation, partial cross-section view of a joystick system according to another implementation of the present technology.

FIG. 11 illustrates a partial cross-section of a joystick system 400 according to another implementation of the present technology. Here a joystick 410 is equipped with a variable biasing mechanism 401 using two springs 405 and 407. The springs 405, 407 are connected together via a movable washer 406. There is a ramp 409, similar to the ramp 103 described above, which pushes a boot 404 upward as the joystick 410 is pivoted.

In this implementation, however, there is only one slope of the ramp 409. The operator detects a change in the mechanical resistance when passing the threshold angle 152 because the second spring 407 has higher resistance and will provide resistance when the first spring 405 is fully compressed, at the threshold angle 154.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A joystick system for a watercraft, the watercraft having at least two thrust generation devices, the joystick system comprising:
 a joystick pivotable about an axis, the joystick having:
  a low range of motion about the axis, the low range spanning from a rest angle to a threshold angle, and
  a high range of motion about the axis, the high range spanning from the threshold angle to a maximum angle;
 at least one joystick position sensor operatively connected to the joystick, the at least one joystick position sensor being adapted for producing pivot signals indicative of a position of the joystick about the axis; and
 a control module operatively connected to the at least one joystick position sensor, the control module producing engine thrust request signals operative to control a resultant thrust of the at least two thrust generation devices in response to receiving the pivot signals from the at least one joystick position sensor,
  the resultant thrust increasing from a minimum thrust to a threshold thrust at a first rate of increase as the joystick moves from the rest angle toward the threshold angle in the low range,
  the resultant thrust increasing from the threshold thrust to a maximum thrust at a second rate of increase as the joystick moves from the threshold angle toward the maximum angle in the high range,
  the second rate of increase being greater than the first rate of increase.

2. The joystick system of claim 1, wherein movement of the joystick about the axis causes the control module to produce the engine thrust request signals operative to control the resultant thrust such that the watercraft moves in at least one of a forward direction and a backward direction.

3. The joystick system of claim 1, wherein:
 the axis is a first axis;
 the low range from the rest angle to the threshold angle is a first low range from the rest angle to a first threshold angle;
 the high range from the threshold angle to the maximum angle is a first high range from the first threshold angle to a first maximum angle; and
 the joystick is further pivotable about a second axis, the joystick further having:
  a second low range of motion about the second axis, the second low range spanning from the rest angle to a second threshold angle, and
  a second high range of motion about the second axis, the second high range spanning from the second threshold angle to a second maximum angle;
 the at least one joystick position sensor is further adapted for producing pivot signals indicative of a position of the joystick about the second axis; and
 the control module further produces engine thrust request signals operative to control the resultant thrust of the at least two thrust generation devices in response to receiving the pivot signals from the at least one joystick position sensor,
  the resultant thrust increasing from the minimum thrust to the threshold thrust at a third rate of increase as the joystick moves from the rest angle toward the second threshold angle in the second low range, the resultant thrust increasing from the second threshold thrust to a second maximum thrust at a fourth rate of increase as the joystick moves from the second threshold angle toward the second maximum angle in the second high range,
the fourth rate of increase being greater than the third rate of increase.

4. The joystick system of claim 3, wherein:
the first and third rates of increase are equal; and
the second and fourth rates of increase are equal.

5. The joystick system of claim 3, wherein movement of the joystick about the second axis causes the control module to produce engine thrust request signals operative to control the resultant thrust such that the watercraft moves in at least one of a starboard direction and a port direction.

6. The joystick system of claim 3, wherein:
a first total range of motion is defined by a sum of the first low range and the first high range;
a second total range of motion is defined by a sum of the second low range and the second high range; and
the first and second total ranges of motion are equal.

7. The joystick system of claim 1, wherein:
the joystick defines a rotation axis, the joystick being adapted for twisting about the rotation axis, and
twisting the joystick about the rotation axis causes the control module to produce engine thrust request signals operative to control a yaw motion of the watercraft.

8. The joystick system of claim 1, wherein the threshold angle is about 80% of the maximum angle.

9. The joystick system of claim 1, further comprising a feedback mechanism adapted for indicating to an operator that the joystick has moved from one of the low and high ranges to an other one of the low and high ranges.

10. The joystick system of claim 9, wherein the feedback mechanism is a tactile feedback mechanism.

11. The joystick system of claim 10, wherein the tactile feedback mechanism is a variable biasing mechanism, the variable biasing mechanism biasing the joystick toward the rest angle with a first resistance force when the joystick is within the low range and with a second resistance force when the joystick is within the high range, the second resistance force being greater than the first resistance force.

12. The joystick system of claim 11, wherein the variable biasing mechanism comprises:
a ramp disposed adjacent the joystick, the ramp having:
a first zone having a first slope with respect to the joystick at the rest angle, and
a second zone having a second slope, with respect to the joystick at the rest angle, the second slope being greater than the first slope;
a boot movably disposed about the joystick;
a spring engaging the joystick at a first end and engaging the boot at a second end; and
wherein:
the boot contacts the first zone of the ramp in the low range of motion of the joystick, the first slope causing the boot to move with respect to the joystick and compress the spring at a first rate,
the boot contacts the second zone of the ramp in the high range of motion of the joystick, the second slope causing the boot to move with respect to the joystick and compress the spring at a second rate, the second rate being greater than the first rate.

13. The joystick system of claim 9, wherein the feedback mechanism is a light indicator.

14. The joystick system of claim 1, wherein the control module is adapted for controlling a steering position of the at least two thrust generation devices.

15. A watercraft comprising:
a hull;
a deck disposed on the hull;
at least two thrust generation devices operatively connected to one of the hull and the deck;
a joystick system operatively connected to the at least two thrust generation devices, the joystick system comprising:
a joystick pivotable about an axis, the joystick having:
a low range of motion about the axis, the low range spanning from a rest angle to a threshold angle, and
a high range of motion about the axis, the high range spanning from the threshold angle to a maximum angle;
a joystick position sensor operatively connected to the joystick, the joystick position sensor being adapted for producing pivot signals in response to sensing the joystick pivoting about the axis; and
a control module operatively connected to the joystick position sensor, the control module producing engine thrust request signals operative to control a resultant thrust of the at least two thrust generation devices in response to receiving the pivot signals from the joystick position sensor,
the resultant thrust increasing from a minimum thrust to a threshold thrust at a first rate of increase as the joystick moves from the rest angle toward the threshold angle in the low range,
the resultant thrust increasing from the threshold thrust to a maximum thrust at a second rate of increase as the joystick moves from the threshold angle toward the maximum angle in the high range,
the second rate of increase being greater than the first rate of increase.

16. The watercraft of claim 15, further comprising:
a steering wheel operatively connected to the deck;
a throttle lever operatively connected to the deck, the steering wheel and the throttle lever being adapted for controlling motion of the watercraft; and
wherein:
the control module is adapted to redirect control of motion of the watercraft from the steering wheel and the throttle lever to the joystick system when a joystick system control mode initiated by an operator via the control module,
the at least two thrust generation devices are at least two outdrives, and
the control module controls the at least two outdrives to rotate to a splayed arrangement when the joystick system control mode is initiated by the operator.

17. The watercraft of claim 16, wherein:
the control module controls the at least two outdrives to be disposed in a splayed arrangement when the joystick is in the low range; and
the control module controls the at least two outdrives to be in a forward-facing arrangement when the joystick is in the high range.

18. A method for controlling movement of a watercraft using a joystick system, the joystick system having a joystick operatively connected to at least one joystick position sensor, the joystick position sensor being operatively connected to a control module, the control module being adapted for controlling at least two thrust generation devices of the watercraft, the method comprising the steps of:

in response to the control module receiving a signal from the at least one joystick position sensor indicative of the joystick being pushed forward about a first axis from a rest angle, sending, by the control module, signals operative to move the watercraft in a forward direction at a first rate of increase of a resultant thrust of the at least two thrust generation devices;

in response to the control module receiving a signal from the at least one joystick position sensor indicative of the joystick being pushed forward past a threshold angle, sending, by the control module, signals operative to move the watercraft in the forward direction at a second rate of increase of the resultant thrust of the at least two thrust generation devices, the second rate of increase being greater than the first rate of increase; and in response to the control module receiving a signal from the at least one joystick position sensor indicative of the joystick being returned to the rest angle, sending, by the control module, signals operative decrease the resultant thrust of the at least two thrust generation devices.

19. The method of claim 18, further comprising the steps of:

in response to the control module receiving a signal from the at least one joystick position sensor indicative of the joystick being pushed rightward about a second axis from the rest angle, sending, by the control module, signals operative to move the watercraft in a starboard direction at a third rate of increase of the resultant thrust of the at least two thrust generation devices;

in response to the control module receiving a signal from the at least one joystick position sensor indicative of the joystick being pushed rightward past a second threshold angle, sending, by the control module, signals operative to move the watercraft in the starboard direction at a fourth rate of increase of the resultant thrust, the third rate of increase being greater than the fourth rate of increase; and in response to the control module receiving the signal from the at least one joystick position sensor indicative of the joystick being returned to the rest angle, sending, by the control module, signals operative decrease the resultant thrust of the at least two thrust generation devices.

20. The method of claim 18, wherein:

the at least two thrust generation devices are outdrives;

the at least two thrust generation devices are in a splayed arrangement; and in response to the control module receiving the signal from the at least one joystick position sensor indicative of the joystick being pushed forward past the threshold angle, the control module further sends signals operative to rotate the at least two outdrives into a forward-facing arrangement.

* * * * *